(No Model.)
2 Sheets—Sheet 1.
H. IVES.
Cultivator.
No. 231,582.
Patented Aug. 24, 1880.
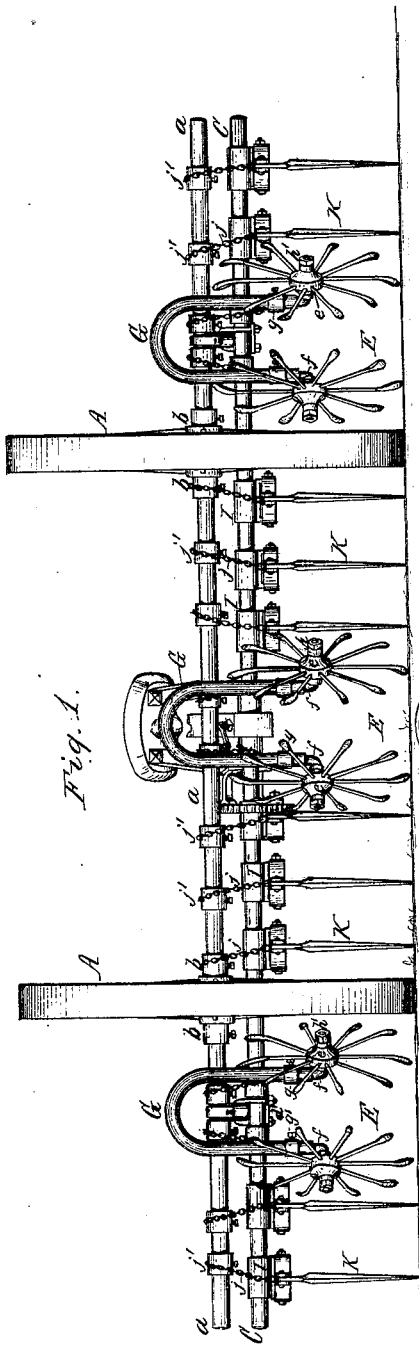
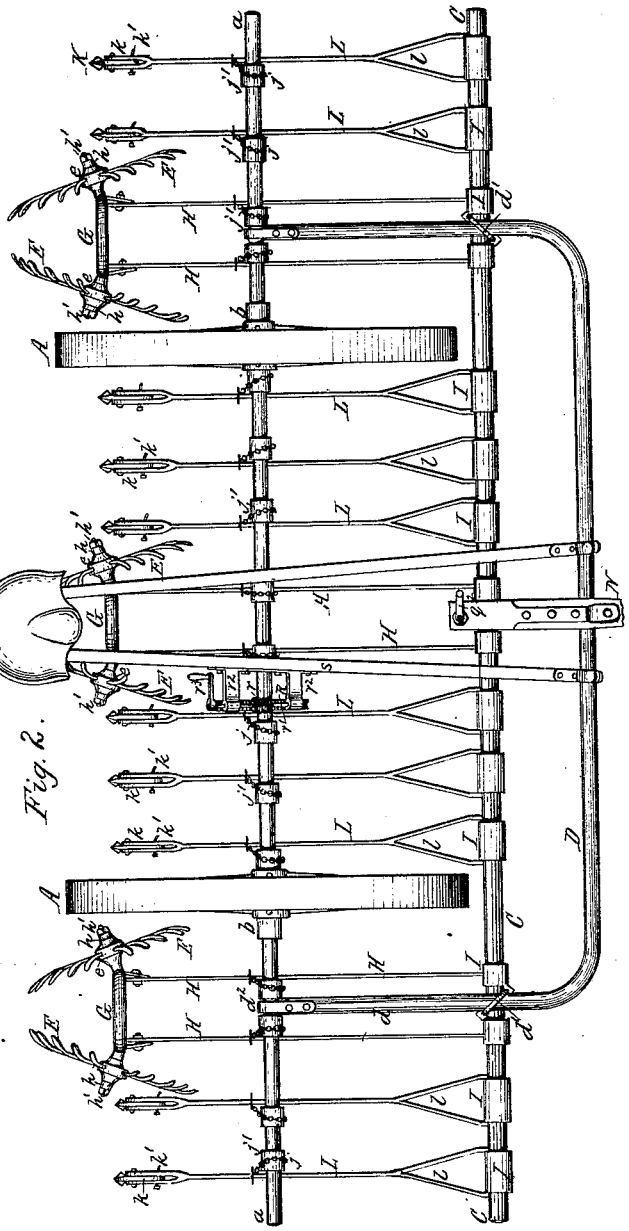

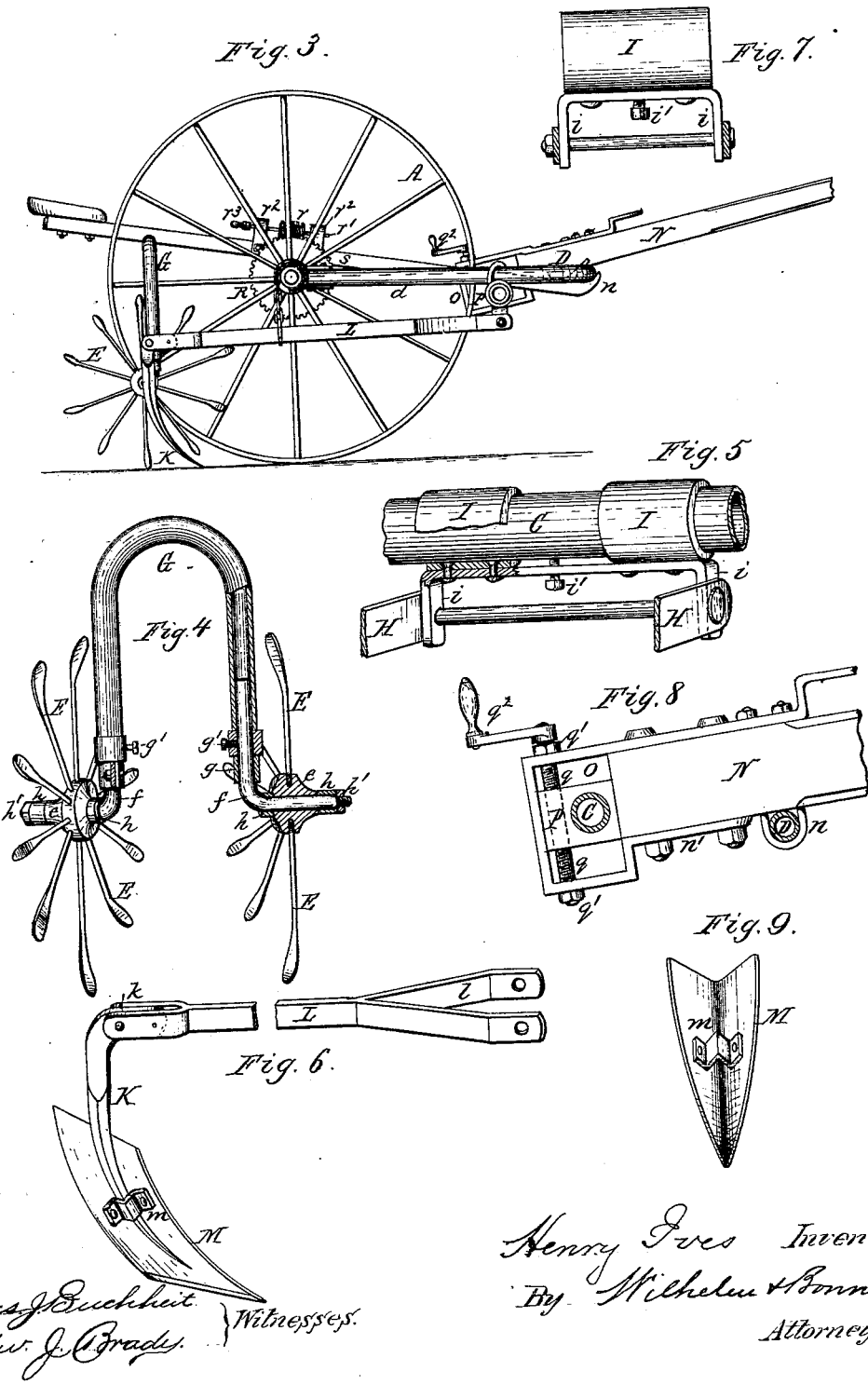

UNITED STATES PATENT OFFICE.

HENRY IVES, OF BATAVIA, NEW YORK.

CULTIVATOR.

SPECIFICATION forming part of Letters Patent No. 231,582, dated August 24, 1880.

Application filed May 8, 1880. (No model.)

*To all whom it may concern:*

Be it known that I, HENRY IVES, of Batavia, in the county of Genesee and State of New York, have invented new and useful Improvements in Cultivators, of which the following is a specification, reference being had to the accompanying drawings.

This invention relates to a cultivator which is designed to loosen, scarify, or agitate the ground between the rows of growing crops, such as corn, potatoes, and beans.

My invention consists, principally, of a cultivator composed of two rearwardly-converging sets of rotating teeth arranged on opposite sides of the row of plants to be cultivated, whereby the teeth are caused to enter and open the ground on both sides of the row of plants and adjacent thereto as the machine is drawn along; also, in combining with a cultivator composed of two sets of rotating teeth curved teeth arranged on the outer side of the rotating teeth parallel with the line of draft, whereby the ground between the rows of plants is opened; also of several details in the construction of the parts which constitute my improved machine, as will be hereinafter fully set forth.

In the accompanying drawings, consisting of two sheets, Figure 1 is a rear elevation of my improved cultivator. Fig. 2 is a top-plan view, and Fig. 3 is a side elevation thereof. Fig. 4 is a rear elevation on an enlarged scale, partly in section, of a pair of sets of rotating teeth and connecting parts. Fig. 5 is a perspective view, on an enlarged scale, of the sleeve by which the arms which carry the rotating teeth are attached to the frame of the machine. Fig. 6 is a perspective view, on an enlarged scale, of one of the curved teeth and connecting parts. Fig. 7 is a rear elevation of the sleeve to which the arm of the curved tooth is attached. Fig. 8 is a side elevation, on an enlarged scale, of the mechanism by which the front part of the frame is raised and lowered. Fig. 9 is a perspective view of a broad cultivator-tooth adapted to be applied to the curved teeth of my improved machine.

Like letters of reference designate similar parts in the several figures.

$a$ represents the shaft, upon which the wheels A are mounted so as to turn loosely thereon. The wheels A are held against lateral movement on the shaft $a$ by collars $b$, which are secured to the shaft by set-screws, so that by shifting the collars $b$ on the shaft $a$ the wheels can be laterally adjusted on the shaft to correspond with the distance between the rows of plants which are to be cultivated.

The machine represented in the drawings is designed to cultivate three rows at a time, the requisite number of teeth for cultivating a row being arranged, respectively, between the wheels and on the outside of each wheel.

C represents a bar or rod arranged in front of the wheels A parallel with the shaft $a$, and connected with the latter by a bent bar or rod, D, the front portion of which is arranged parallel with the shaft $a$ and the bar D, and in front of the latter, while its ends are bent and extended backward over the bar C to the shaft $a$, as shown at $d$. The bar D is connected with the bar C by a clip, $d'$, and each of the rearwardly-extending portions $d$ of the bar D is provided with a bearing, $d^2$, in which the shaft $a$ can turn.

The bars C and D may be constructed of iron pipe, if preferred, and they, together with the shaft $a$, constitute the frame of the machine.

E represents a set of radial teeth which are slightly curved at their points and connected to a hub, $e$, which turns freely on an arbor, $f$. Two sets of teeth, E, are arranged to operate simultaneously upon the ground adjacent to each row of plants on opposite sides thereof.

The arbor $f$ is constructed in the form of an elbow, the horizontal portion of which supports the hub $e$, while its vertical portion is inserted in a socket, $g$, formed in each end of a U-shaped bar or rod, G, the bend of which is made of sufficient width and height to clear the row of growing plants which it straddles. The U-shaped bar G is preferably constructed of iron pipe, and the upright portion of the arbor $f$ is secured in each open end thereof by a set-screw, $g'$. The horizontal portion of the arbor $f$ is made somewhat longer than the hub $e$, and the spaces on the arbor are filled by thimbles or sleeves $h$, which are held on the arbor by a screw-nut, $h'$, and which can be removed and be exchanged for shorter or longer ones when it is desired to change the position of the toothed wheel E on the arbor.

The two sets of radial teeth or toothed wheels E, which are attached to the same U-shaped bar G, and which are designed to operate upon opposite sides of the same row of plants, have their arbors arranged at an angle to the line of draft, so that the two sets of teeth which are connected together converge rearwardly at a greater or less angle, which can be adjusted by turning the upright portions of the arbors $f$ in their sockets.

H H represent two parallel arms having their rear ends connected with the vertical portion of the arbors $f$, below the U-shaped frame G, by means of a socket formed on the arms H, and through which the vertical portion of the arbor $f$ passes. The arms H extend forward under the shaft $a$ and rod C, and are attached with their forward ends to a sleeve, I, which surrounds the bar C, and is provided with two downwardly-projecting lugs, $i$, to which the forward ends of the arms H are pivoted.

The sleeve I is secured to the bar C by a set-screw, $i'$.

$j$ represents a chain which connects each arm H with the shaft $a$, upon which the chain is wound, and to which it is attached by a collar, $j'$, which is fastened to the shaft $a$ by a set-screw. Upon releasing the set-screws of the sleeve I and the collars $j'$ the arms H, with the U-shaped bar G, and the toothed wheels E, attached thereto, can be adjusted laterally, as may be necessary to correspond with the distance between the several rows of plants to be cultivated.

K represents curved teeth arranged singly on the outer sides of the toothed wheels E and in planes parallel with the line of draft. The teeth K are pivoted at their upper ends to forwardly-extending arms L, which are slotted at their rear ends to receive the bent upper end, $k$, of each tooth K. A safety-pin, $k'$, is inserted through the slotted portion of the arm L and the bent portion of the tooth K, so that when the tooth strikes an obstruction which it is unable to overcome the pin $k'$ will break and release the tooth, thereby preventing the breaking of the tooth. The forked forward end, $l$, of each arm L is pivoted to an adjustable sleeve, I, like that to which the arms H are pivoted.

The lower ends of the teeth K are curved forward, so as to enter the ground easily, and they serve not only to loosen the ground, but also raise to the surface any grass or weeds that they may strike. The teeth K are made square in cross-section and tapering to a point, so that an ordinary cultivator-tooth, M, provided on its rear side with a socket, $m$, of corresponding form may be slipped on each tooth K when desired.

The arms L are connected with the shaft $a$ by chains $j$ and adjustable collars $j'$, in the same manner in which the arms H are connected with the shaft $a$.

N represents the draft-pole, which is connected with the front cross-bar, D, of the frame by a clip, $n$, and braces $n'$. The rear end of the pole N is provided with an open frame, O, in which is arranged a block, $p$, through which the cross-bar C passes. $q$ is a screw which passes vertically through the rear portion of the block $p$, and which is held against vertical movement in the frame O by collars or nuts $q'$. The screw $q$ is provided above the frame O with a hand-crank, $q^2$. By turning the screw $q$ in one or the other direction, the block $p$ and the rod C, held therein, are raised or lowered, and the forward end of the frame of the machine is correspondingly lowered or raised, thereby adjusting the height at which the forward ends of the arms H and L are carried.

R represents a gear-wheel secured to the shaft $a$, and $r$ is a worm-wheel meshing with the wheel R and secured to a shaft, $r'$. The latter turns in bearings $r^2$, secured to a bar, $s$, which is secured to the frame of the machine in any suitable manner. The rear end of the shaft $r'$ is provided with a hand-crank, $r^3$. By turning the crank $r^3$ in one or the other direction the shaft $a$ is turned in its bearings, and the chains $j$ are wound upon the shaft $a$ or unwound therefrom, thereby raising or lowering the rear ends of the arms H and L and the teeth attached thereto. By this means the depth to which the teeth enter the ground can be regulated, and when the teeth are not desired to enter the ground they can be raised and carried above the ground.

As the machine is drawn along over the rows of growing plants the rotating teeth enter the ground, and in turning on their arbor they open the ground from the point where they enter toward the plants without turning the ground over. The ground is thereby loosened in close proximity to the plants, and the latter are prevented from being covered with earth, which frequently happens with ordinary cultivators, to the great damage of the growing plants. The curved teeth K at the same time loosen the ground between the hills or rows of plants and remove the weeds from that portion of the ground upon which they operate. When the plants have grown so high that the bent bars G do not clear them any longer the latter, with the rotating teeth attached thereto, are removed, and, if desired, ordinary cultivator-points may now be attached to the curved teeth, as shown in Fig. 9, as the plants are now so large that they are no longer in danger of being covered with earth.

My improved machine is easily adjusted to the different widths at which the rows of plants may be located, and as it operates upon three rows at a time it performs its work very expeditiously and economically.

I claim as my invention—

1. In a cultivator, the combination of two sets of rotating pointed rods or teeth, E, converging rearwardly, and curved pointed rods or teeth K, arranged at suitable distances apart on the outer sides of the sets of rotating teeth in planes parallel with the line of draft, whereby the ground is opened or scarified without being turned over on both sides of the same row of plants and between the rows or hills, arch G, and drag-bars H L, substantially as set forth.

2. The combination, with two sets of rotating teeth, E, of the connecting U-shaped bar G and arms H, whereby the ends of the bar G are connected with the frame of the machine, substantially as set forth.

3. The combination, with the rotating teeth E, U-shaped connecting-bar G, and arms H, of the sleeve I, supporting the forward ends of the arms H, and made laterally adjustable on the frame of the machine, substantially as set forth.

4. The combination, with the U-shaped bar G, provided with sockets $g$, of the elbow-shaped arbors $f$, inserted with their vertical portions adjustable in the sockets $g$ and carrying upon their horizontal portions the hubs $e$, to which the teeth E are secured, substantially as set forth.

5. The combination, with the shaft $a$, of the wheels A, made laterally adjustable thereon, rotating teeth E, mounted on arbors $f$, which are attached to laterally-adjustable frames G H, and curved teeth K, arranged between the several sets of rotating teeth and secured to laterally-adjustable arms L, substantially as set forth.

HENRY IVES.

Witnesses:
M. D. BABCOCK,
W. HARRIS DAY.